UNITED STATES PATENT OFFICE.

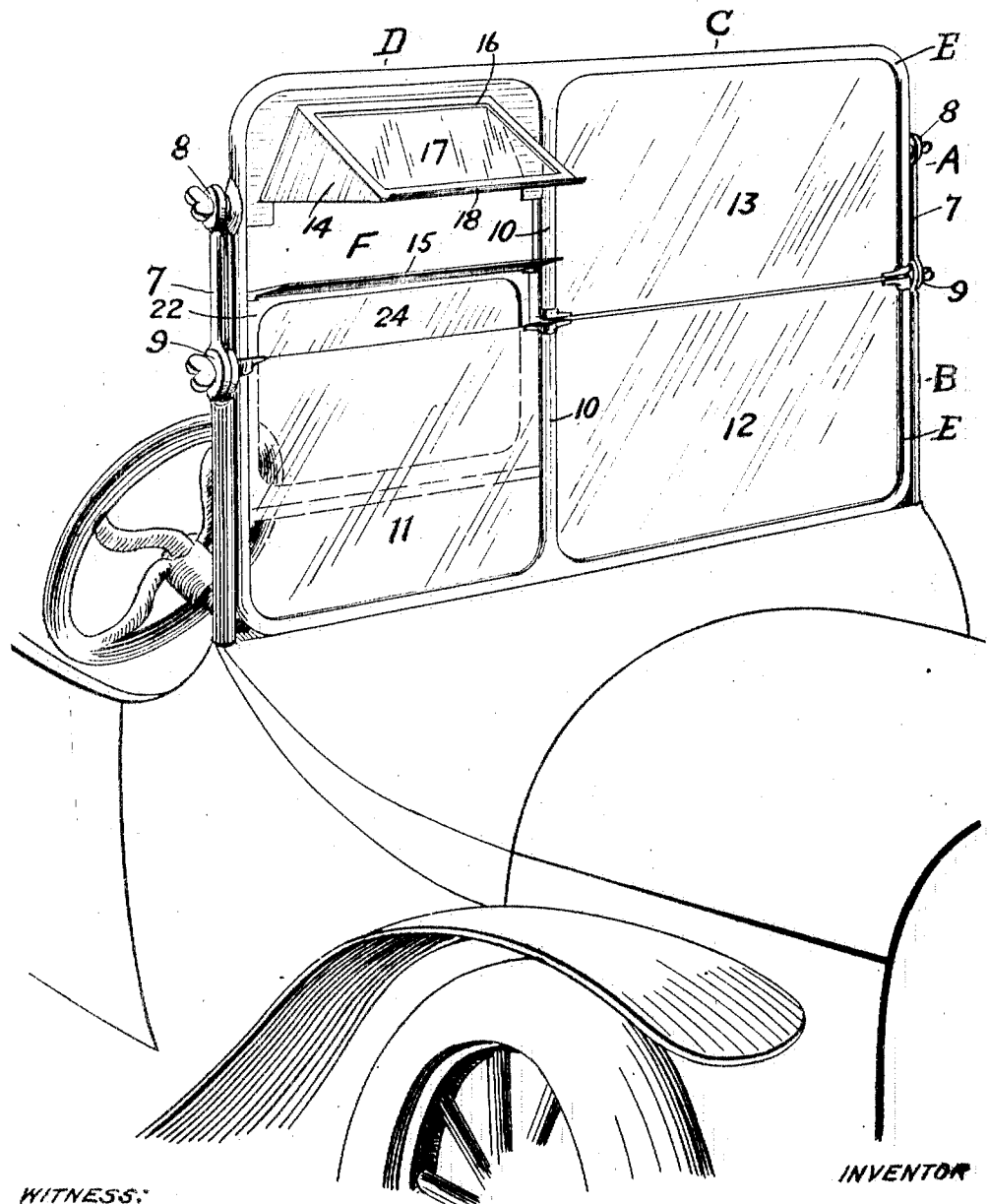

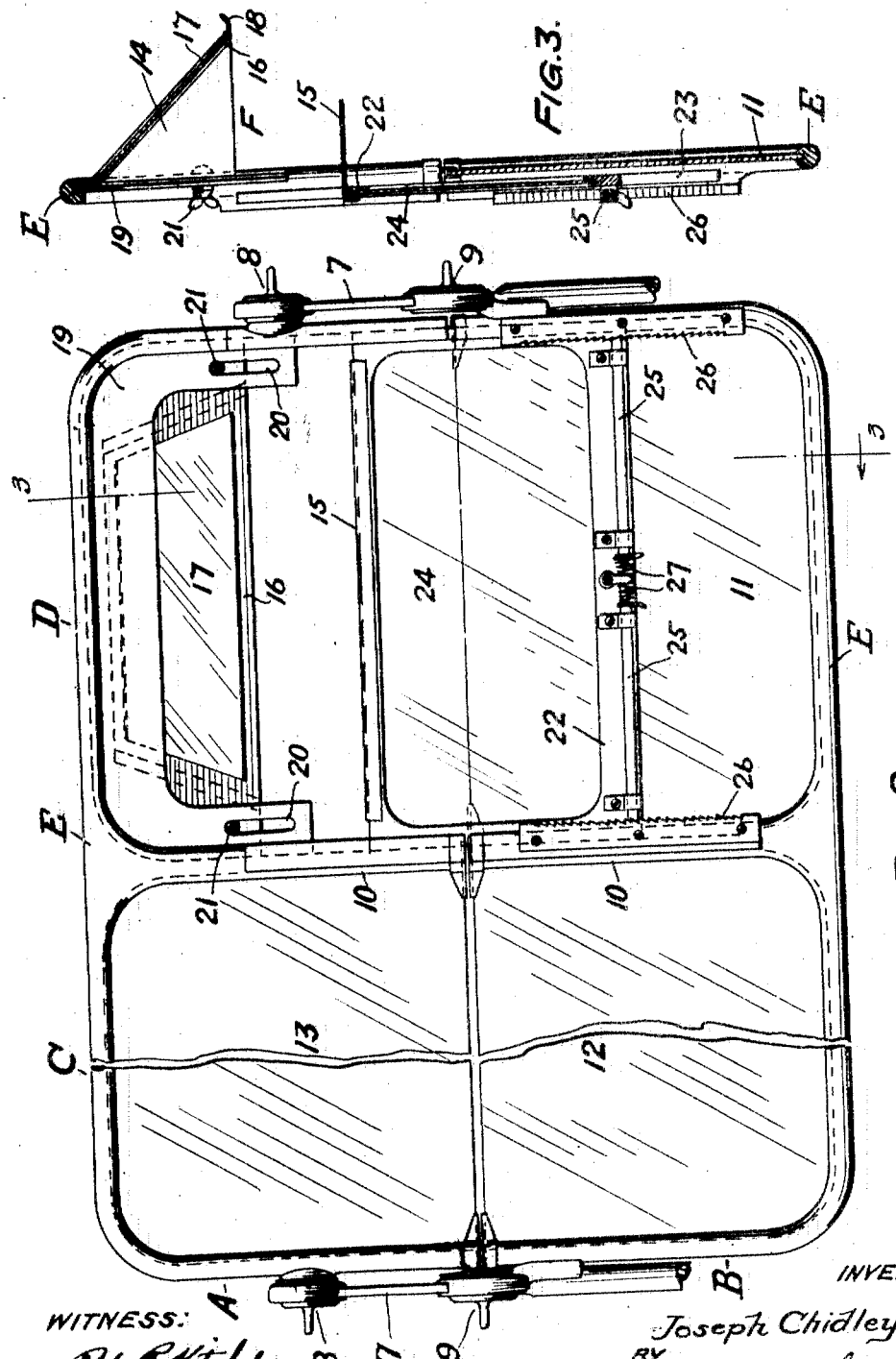

JOSEPH CHIDLEY, OF CLEVELAND, OHIO, ASSIGNOR TO CLEAR VISION WINDSHIELD COMPANY, OF DETROIT, MICHIGAN, A CORPORATION OF MICHIGAN.

WIND-SHIELD.

1,315,760.     Specification of Letters Patent.     Patented Sept. 9, 1919.

Application filed January 6, 1916, Serial No. 70,566. Renewed July 15, 1919. Serial No. 311,107.

*To all whom it may concern:*

Be it known that I, JOSEPH CHIDLEY, a citizen of the United States, residing at Cleveland, in the county of Cuyahoga and State of Ohio, have invented certain new and useful Improvements in Wind-Shields, of which the following is a specification.

This invention relates to a novel form of wind shield for use on automobiles, street cars, and other vehicles, and it has for one of its primary objects the provision of an improved arrangement of combination shield and rain vision device which is simple and economical in construction, and which is easily manipulated. My invention also contemplates the provision of a lookout device or rain vision device which is adjustable but which, however, does not interfere with the ordinary operation and use of the shield in fair weather, as will further appear.

The foregoing, together with such other objects as may hereinafter appear or are incident to my invention I accomplish by means of a construction which I have illustrated in preferred form in the accompanying drawings, wherein—

Figure 1 is a front elevation of my improvement as applied to an automobile; Fig. 2 is a rear elevation of the device, drawn, however, on a larger scale, and partly broken away; and Fig. 3 is a section taken on the line III—III of Fig. 2.

My invention will best be understood when shown and described as applied to an automobile. In Fig. 1, I have shown a portion of the hood and the cowl of an automobile with my improvement in position above the cowl. The shield is divided horizontally into two sections, A and B, the lower section being preferably rigidly mounted above the cowl, while the upper section A is pivotally supported in the links 7, as indicated at 8, the links in turn being pivotally supported on the frame of the section B, as indicated at 9. The upper section A, therefore, can be rocked about the pivotal points 8 as an axis, or may be swung bodily with respect to the lower section about the pivotal points 9 as an axis and folded over the lower section, either in front or in back of the latter. The foregoing adjustments are provided to suit the convenience of the driver, the position of the upper section being altered largely for purposes of ventilation in pleasant weather. In rainy or snowy weather, however, the section A is usually in the position shown in Fig. 1, which necessitates the provision of means for providing a clear field of vision because of the rain or snow deposited upon the shield greatly impairs the field of vision. To meet this condition I provide the mechanism now to be described.

It will be seen from inspection of Fig. 1 that I have also divided the shield vertically into two sections or divisions C and D, the latter of which is provided with the rain vision or outlook device. These sections or divisions may be transposed, if desired, depending upon whether the car is of the left hand or right hand drive type. The frames E of the upper and lower halves of the shield are preferably brass rods and are of the usual general construction with the exception that they are provided with an intermediate or third leg 10, the legs serving to divide the shield vertically into the two divisions, C and D. The lower frame E is suitably milled or slotted to receive the glasses 11 and 12, and the upper frame E is also milled to receive the glass 13, the remaining upper corner section, however, has no glass, and is provided with the lookout device F, as will further appear.

The lookout device F comprises an upper hood-like member 14 and a lower member 15. The upper member 14 consists of a frame work 16 in the front wall of which is fastened in any preferred manner, a pane of glass 17, the side walls of the frame sloping inward toward the top and the front edge of the frame being turned up in the form of a lip 18 which extends transversely across the frame so as to carry off the moisture deposited to the sides. The member 14 is slidably mounted in the slotted frame 19, which frame is set into the frame E and secured thereto in any preferred manner. The frame 19 is substantially U-shaped (see Figs. 1 and 2) and is provided with a pair of slots 20 adapted to receive the thumb screws 21 which are carried by the framework 16 of the member 14. By this means, the member 14 is adjustably supported in the frame 19 and it may be raised or lowered as the need therefor arises, the thumb screws 21 serving to fix the member 14 in any adjusted position. The purposes of this adjustment will appear.

The lower member 15 is substantially a flat plate or shell which is supported on a frame 22, which frame is slidably mounted in slots 23 milled into the framework E of the lower section B. A pane of glass 24 is set into the frame 22. The frame 22 is adjustably supported by means of the toothed rods 25, each of which engages a notched bar or rack 26 fastened on the rear of the frame of the lower section B. The rods 25 are normally held into engagement with the notched bars 26 by means of the spring 27.

It will be seen from the foregoing that the upper and lower members of the lookout device are each adjustable and each capable of movement toward or from the other member. By means of this arrangement it is possible not only to alter the width of the sight opening provided between the members 14 and 15, but also to adjust the members vertically to alter the level of the sight opening to suit the convenience of the driver. The two members 14 and 15 coöperate to set up diverging currents of air which carry particles of rain or snow away from the sight opening between the two members, thus making it possible to secure a maximum range of vision, while at the same time the elements are effectually excluded. It will also be noted that when the framework 22 is dropped to lowermost position, the top of the framework comes just below the lower edge of the upper section A, thus making it possible to rock or fold over the section A either in front or behind the section B, as may be desired. By my improved arrangement, therefore, it will be seen that I have provided a shield which is divided vertically into two sections, a plain section and a section provided with a variable lookout device; and which is also divided horizontally into two sections relatively movable with respect to each other; while at the same time the variable look out device may be shifted to suit the requirements of wet weather and retracted so as not to interfere with the manipulation of the movable section. The lookout device is simple and economical, and in addition to the advantages hereinbefore pointed out, it affords but a minimum obstruction in the normal field of vision. Other advantages will occur to those familiar with the art.

I claim:—

1. The combination with a wind shield divided horizontally into sections, one of which is movable relative to the other, of a rain vision lookout gap device comprising a member mounted on the movable section, and a second member coöperating therewith mounted on the other section and movable into and out of the path of movement of the movable section.

2. In a wind shield comprising an upper and a lower section, the upper one of which folds with reference to the lower section to either side thereof, the combination of a rain vision lookout gap device comprising a member carried by the upper section and a second member adapted to coöperate therewith slidably mounted on the lower section for movement into and out of the path of movement of the upper section.

3. In a wind shield comprising an upper and a lower section, each having a glass and the upper section being mounted for folding movement with reference to the lower section to either side thereof, the combination of a rain vision lookout gap device comprising a member carried by the upper section and a second member adapted to coöperate therewith slidably mounted on the lower section for movement into and out of the path of movement of the upper section.

4. A wind shield comprising in combination a lower section, an upper section for folding movement to either side of said section and also pivoted for rotary movement on a horizontal axis above said lower section, and a rain vision lookout gap device comprising a member carried by the upper section, and a second member adapted to coöperate therewith carried by the lower section and movable vertically above the upper edge of said lower section to coöperate with said first member.

5. In a wind shield having a lower section and an upper folding section, each section having a frame provided with an intermediate leg dividing the section into two parts, panes of glass supported in three of said parts, and a rain vision lookout gap device comprising a member mounted in the fourth or open part and a second member coöperating therewith and mounted on the lower section for movement thereabove to coöperate with said first member.

6. A wind shield comprising in combination a pair of relatively movable frames each provided with a glass and each having grooves adapted to register when the frames are brought into alinement, and a rain vision lookout gap device comprising a pair of coöperating members one of which is mounted on one frame and the other in the grooves of the other frame, said other member being slidable into the grooves of the first mentioned frame when the frames are brought into alinement to coöperate with said first member.

7. A wind shield comprising in combination a lower frame and an upper frame pivoted thereto, both of said frames being grooved, and a rain vision lookout gap device consisting of a pair of coöperating members one of which is mounted on the upper frame and the other slidably mounted in the grooves of the lower frame, said other member being also slidable in the grooves of the upper frame to coöperate with said first member when the two frames are brought into alinement.

8. A wind shield comprising in combination a lower frame and an upper frame pivoted thereto, both of said frames being grooved, and a rain vision lookout gap device consisting of a pair of coöperating members one of which is mounted on the upper frame and the other slidably mounted in the grooves of the lower frame, said other member being also slidable in the grooves of the upper frame to coöperate with said first member when the two frames are brought into alinement, and means for locking said second member in adjusted position.

9. A wind shield comprising in combination an upper frame and a lower frame pivoted thereto, both of said frames being grooved, and a rain vision lookout gap device consisting of a pair of coöperating members one of which is adjustably mounted on the upper frame and the other slidably mounted in the grooves of the lower frame, said other member being also slidable in the grooves of the upper frame and coöperating with the first member when the two grooves are brought into alinement, and means whereby the upper member is locked in adjusted position.

10. A wind shield comprising in combination a lower frame and an upper frame pivoted thereto, and a rain vision lookout gap device consisting of a pair of coöperating members one of which consists of a hood-like member mounted on the upper frame and the other member being slidably mounted on the lower frame and having a forwardly projecting plate, said other member being movable above the lower frame for coöperation with said first member.

In testimony whereof I have hereunto signed my name.

JOSEPH CHIDLEY.